United States Patent [19]

Nakajima

[11] Patent Number: 5,661,764
[45] Date of Patent: Aug. 26, 1997

[54] SLOT RECEPTION SYNCHRONIZATION CIRCUIT

[75] Inventor: Akira Nakajima, Tokyo, Japan

[73] Assignee: NEC Corporation, Japan

[21] Appl. No.: 546,825

[22] Filed: Oct. 23, 1995

Related U.S. Application Data

[63] Continuation of Ser. No. 232,602, Apr. 25, 1994, abandoned.

[30] Foreign Application Priority Data

Apr. 27, 1993 [JP] Japan ................. 5-125113

[51] Int. Cl.$^6$ ........................... H04L 7/00
[52] U.S. Cl. ........................... 375/368; 370/514
[58] Field of Search ................ 375/365, 368; 370/100.1, 105.4, 106, 514, 509, 515, 511

[56] References Cited

U.S. PATENT DOCUMENTS

| | | | |
|---|---|---|---|
| 3,801,956 | 4/1974 | Braun et al. | 375/114 |
| 4,763,339 | 8/1988 | Sutphin et al. | 370/106 |
| 5,018,140 | 5/1991 | Lee et al. | 370/100.1 |
| 5,040,195 | 8/1991 | Kosaka et al. | 370/105.4 |
| 5,058,141 | 10/1991 | Kem et al. | 370/105.4 |

FOREIGN PATENT DOCUMENTS 3-78338  9/1991  Japan .

*Primary Examiner*—Wellington Chin
*Assistant Examiner*—Congvan Tran
*Attorney, Agent, or Firm*—Ostrolenk, Faber, Gerb & Soffen, LLP

[57] ABSTRACT

An input reception data is taken in a reception data shift register 2 under a control of an input control circuit 1. A unique word detection circuit 3 inputs data taken from given bit positions of the reception data taken in the reception data shift register 2 corresponding to bit positions assigned to a unique code and detects the unique code contained in the slot data signal to generate a matching signal. A slot counter sets an initial value in response to the matching signal from the unique word detection circuit 3 to establish a slot synchronization, and notifies establishment of the slot synchronization to a timing control circuit 5. The timing control circuit 5 takes a timing as a reception input completion signal and a timing of overall reception by the matching signal from the unique word detection circuit.

6 Claims, 8 Drawing Sheets

FIG. 4

$$P1 = 1 - P = 1 - \sum_{i=0}^{\varepsilon} NC_i \cdot Pe^i \cdot (1-Pe)^{N-i}$$

| $\varepsilon$ | Pe | P1 | FREQUENCY OF OCCURRENCE (PERIOD) |
|---|---|---|---|
| 1 | $10^{-2}$ | $4.07 \times 10^{-2}$ | 15.4 ms |
| | $10^{-3}$ | $4.86 \times 10^{-4}$ | 1.29 s |
| | $10^{-4}$ | $4.95 \times 10^{-6}$ | 126 s |
| | $10^{-5}$ | $4.96 \times 10^{-8}$ | 3.5 H |
| 0 | $10^{-2}$ | $2.75 \times 10^{-1}$ | 2.27 ms |
| | $10^{-3}$ | $3.15 \times 10^{-2}$ | 19.8 ms |
| | $10^{-4}$ | $3.19 \times 10^{-3}$ | 196 ms |
| | $10^{-5}$ | $3.20 \times 10^{-4}$ | 1.95 s |

FIG. 8 *PRIOR ART*
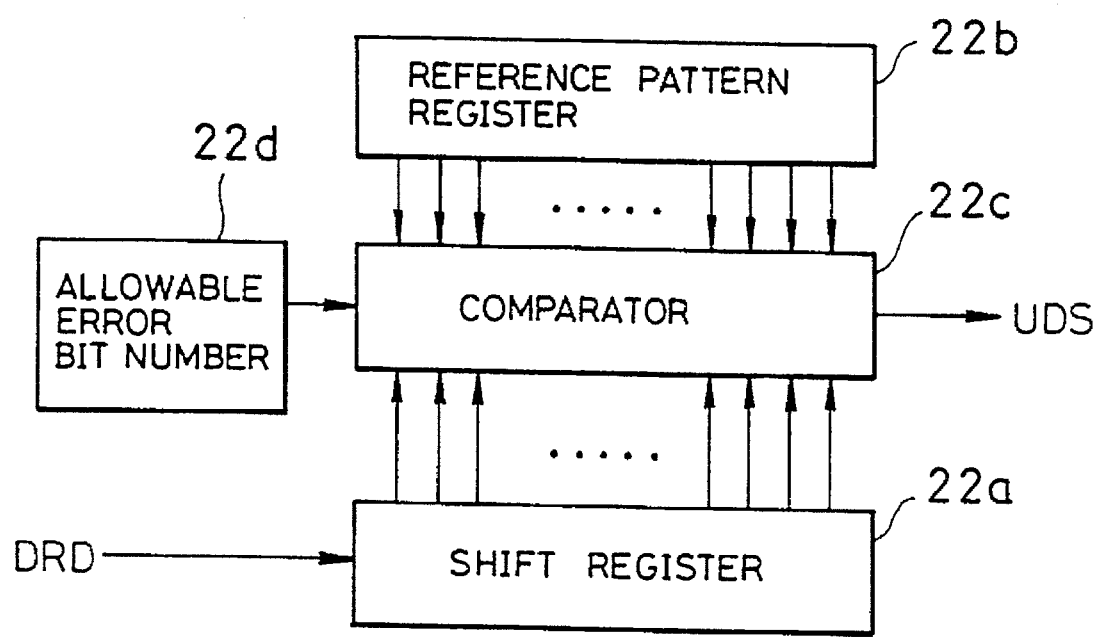

SLOT RECEPTION SYNCHRONIZATION CIRCUIT

This is a continuation of application Ser. No. 08/232,602 filed on Apr. 25, 1994 now abandoned.

BACKGROUND OF THE INVENTION

The present invention relates to a slot reception synchronization circuit. More specifically, the invention relate to a slot reception synchronization circuit for a digital mobile communication system employing a TDMA (Time Division Multiple Access) communication system as communication system, which is employed in a digital cordless telephone, satellite communication and so forth.

The conventional digital mobile communication defines a time frame to be a basic frequency and performs communication by transmitting and receiving digital data signal employing a given period of time (time slot) assigned in the time frame.

Accordingly, a plurality of channels can be multiplexed on the same carrier by the time slot, it becomes necessary to adjust timings of respective communication systems so that mutual interference due to overlapping of the transmission signals at respective channels between the communicating systems will not be caused.

Therefore, a common time reference is provided for communication systems which perform transmission and reception. This is to establish synchronization with the distant system by setting a counter value indicative of time information to be taken by the time slot upon detection of a signal with a particular bit pattern in a reception signal (unique word) to a slot counter when the unique word is detected.

The conventional slot reception circuit comprises an input control circuit 10, a reception data shift register 11, a unique word detection circuit 12, a slot counter circuit 13 and a timing control circuit 14, as shown in FIG. 5.

The reception data input under control of the input control circuit 10 is received in the reception data shift register 11. The reception data shift register 11 is a shift register of m bits corresponding to the length of the communication slot data of the received data.

The unique word detection circuit 12 performs detecting operation for detecting the specific data pattern (unique word of k bits) from the input reception data independently of the reception data receiving operation of the reception data shift register 11.

The slot counter circuit 13 establishes the slot synchronization by the detection signal from the unique word detection circuit 12 and notice the establishment of the slot synchronization to the timing control circuit 14. The timing control circuit 14 performs timing control of the reception data through overall reception.

In the unique word detection circuit 12, exclusive NORs (EXNORs) of the reception data taken in reception data registers 12a-1 to 12a-k from the input control circuit 10 and predetermined k bits of the unique word pattern 12c are taken by exclusive NOR circuits 12b-1 to 12b-k, as shown in FIG. 6. The result of this operation is added in an adder 12d. When all k bits are matched, namely when the sum attained by the adder 12d becomes k, the unique word detection signal is output.

Such type of the slot reception synchronization circuit inputs the reception signal as serial input to the unique word detection circuit 12 which is independent of the reception data shift register 11, in parallel to the input operation to the reception data shift register, for detecting the unique word by detecting matching of all bits.

In this method, the synchronization is established by setting the counter value indicative of the time information to be taken at a timing where the all bits of the signal having the specific data pattern (unique bit of k pattern) are detected, as the initial value for synchronization.

Next, the slot counter circuit 13, in which the synchronization is established, enables input of the reception data to the reception data shift register 11 again at the timing corresponding to the timing of the leading end of the slot for receiving the reception data.

On the other hand, an example for detecting the unique word in the way different from the above-mentioned unique word detection method has been disclosed in Japanese Unexamined Patent Publication No. 3-78338. In the disclosed method, as shown in FIG. 7, a decoding circuit 20 and a unique word detecting circuit 21 are included.

As the decoder circuit 20, there is the decoder circuit employing a Viterbi decoding system as an error correction system. By inputting of the reception burst signal RD, the reception burst signal DRD decoded by the decoding circuit 20 is supplied to a demultiplexing portion (not shown) and also supplied to the unique word detecting circuit 21.

The unique word detecting circuit 21 comprises a unique word detecting circuit main body 22, an error rate prediction circuit 23 and a ROM 24. As shown in FIG. 8, the unique word detecting circuit main body 22 comprises a shift register 22a, a reference pattern register 22b and a comparator 22c.

The shift register 22a is responsive to input of the decoded reception burst signal DRD to convert the reception burst signal DRD into a parallel signal to output to the comparator 22c. The comparator 22c compares the parallel signal output from the shift register 22a and the reference pattern of the unique word from the reference pattern register 22b with taking a predetermined allowable error bit number 22d as a detection threshold value.

The result of comparison of the comparator 22c is output as a unique word detection signal UDS. It should be noted that, for the comparator 22c, a terminal for setting the allowable error bit number 22d is provided.

On the other hand, the error rate prediction circuit 23 inputs a parameter as a bi-product in the process of decoding of the reception burst signal in the decoding circuit 20 and derives an average value of the parameter in time series. This parameter is referred to as path metric.

The error rate prediction circuit 23 predicts the current error rate CS of a channel on the basis of the average value of the parameter in time series. It should be noted that a data indicative of the average value of the parameter in time series and the error rate is preliminarily obtained through experiments and stored in a memory (not shown) of the error rate prediction circuit 23.

The error rate prediction circuit 23 predicts the error rate CS on the basis of the stored data in the memory. Also, ROM 24 preliminarily stores an optimum allowable error bit number HS corresponding to the error rate CS.

When the reception burst signal is received in the slot reception synchronization circuit constructed as set forth above, the reception burst signal RD is decoded by the decoder circuit 20. The reception burst signal DRD decoded by the decoder circuit 20 is supplied to the demultiplexing portion and to the unique word detecting circuit 22.

At the same time, the parameter obtained in the decoder circuit 20 is input to the error rate prediction circuit 23. In the error rate prediction circuit 23, the average value of the parameter from the decoder circuit 20 in time series is calculated. From the average value of the parameter in time series, the current error rate CS is predicted. The error rate CS predicted by the error rate predicting circuit 23 is supplied to the ROM 24 as an address.

From the ROM 24, the optimum allowable error bit number HS corresponding to the error rate CS from the error rate predicting circuit 23 is read out. This optimum allowable error bit number is supplied to the unique word detecting circuit main body 22a and set therein. Namely, in the unique word detecting circuit main body 22a, the optimum allowable error bit number at the current channel quality is set.

By this, the reception burst signal DRD decoded by the decoder 20 is compared the optimum allowable error bit number HS with the reference pattern as the detection threshold value. Therefore, the unique word is detected under a condition where the failure rate of unique word detection and the erroneous detection rate of the unique word becomes minimum.

However, such conventional slot reception synchronization circuit, the unique word detection is performed independently of the reception data register. Therefore, it becomes necessary to initially establish the synchronization of the slot.

Here, the reception data latched at a timing of detection of the unique word is input to the reception data register, but no relationship between the unique word detecting position and the reception data shift register is taken.

Therefore, since the reception data is offset from the normal position, a pitch position correction for normalization is inherently required. Otherwise, in order to take the reception data from the leading end of the slot, the reception data should be abandoned upon detection of the unique word.

Also, in order to correctly receive the data, the data has to be again input to the reception data shift register from the beginning of the slot indicated by the slot timing at which the synchronization is established.

Furthermore, in detection of the unique word, since the conventional slot reception synchronization circuit does not allow any bit error of the unique word, the possibility of failure of detection of the unique word becomes high to make it difficult to perform stable slot reception.

As a solution for this, there is a method to improve the reception certainty by allowing a given number of error bits in the unique word in detection of the unique word. However, since the data of the reception data shift register and the data of the reference pattern register are directly compared by a comparator with an allowable error bit number, elements forming the circuit becomes increased to make the circuit complicate.

SUMMARY OF THE INVENTION

It is an object of the present invention to provide a slot reception synchronization circuit which can correctly perform synchronous reception input without requiring bit position correction and re-trying of reception of the reception data.

Another object of the present invention is to provide a slot reception synchronization circuit which can quite stably detect a unique word even when the channel quality is fluctuate within an allowable range, without increasing the elements in the circuit.

In order to accomplish the above-mentioned and other objects, a slot reception synchronization circuit comprises:

time slot length data holding means for holding a received slot data corresponding to one time slot length;

detecting means for detecting whether data in a given bit range of the slot data held in the time slot length data holding means is a predetermined unique word; and means for performing process control with taking the held slot data stored in the time slot length data holding means upon detection of matching by the detecting means, as a data for one time slot.

BRIEF DESCRIPTION OF THE DRAWING

The present invention will be understood more fully from the detailed description given herebelow and from the accompanying drawings of the preferred embodiment of the invention, which, however, should not be taken to be limitative to the present invention, but are for explanation and understanding only.

In the drawings:

FIG. 4 is an illustration showing a possibility of failure of detection of the unique word;

FIG. 8 is an illustration showing a construction of a unique word detection circuit in FIG. 7.

DESCRIPTION OF THE PREFERRED EMBODIMENT

Figure 1:
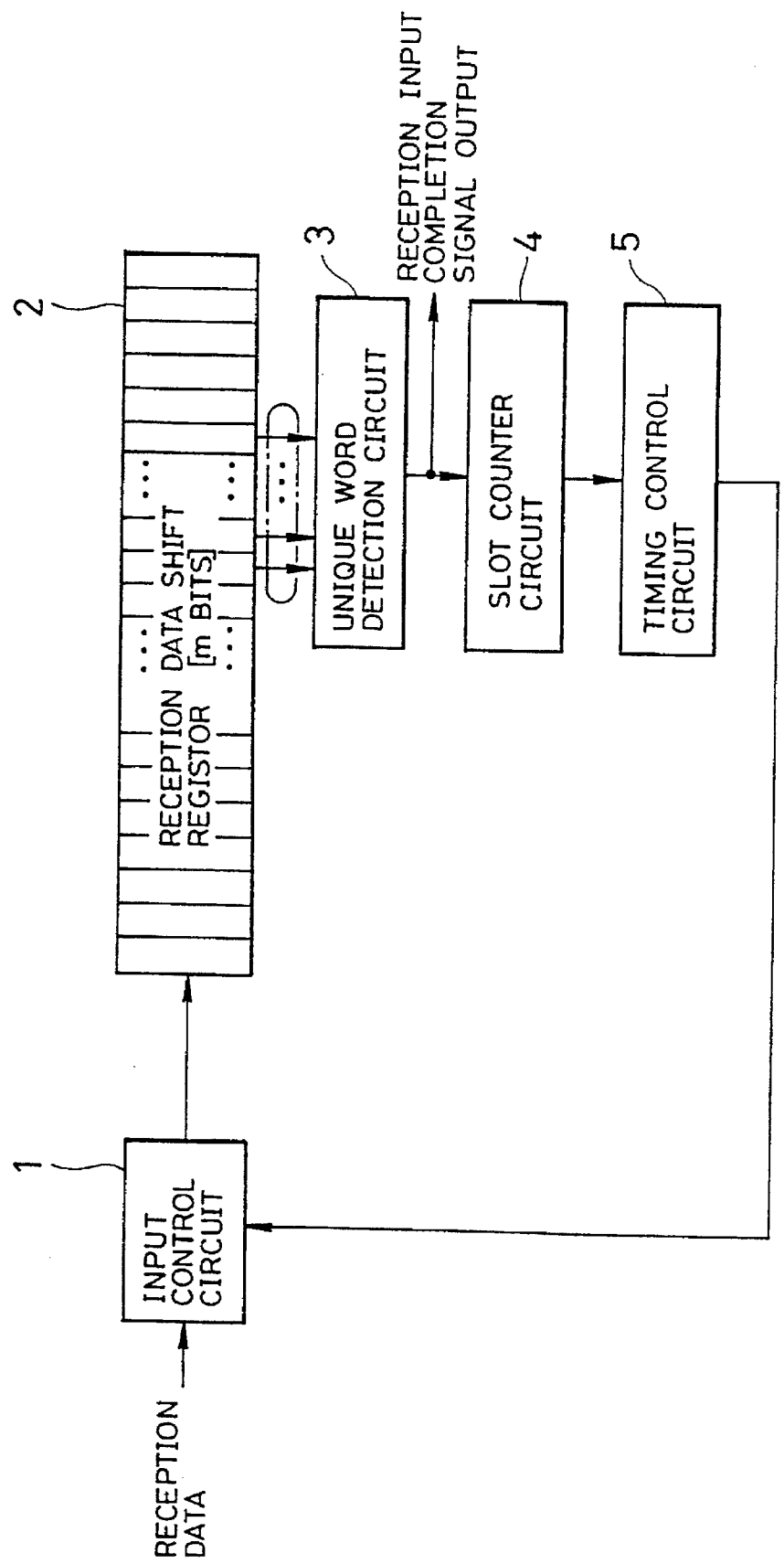
FIG. 1 is a block diagram showing a construction of one embodiment of a slot reception synchronization circuit according to the present invention.

The present invention will be discussed with reference to the accompanying drawings. In FIG. 1, a reception data input under control of an input control circuit 1 is taken in a reception data shift register 2. Here, the reception data shift register 2 is a shift register of m bits having the same length to a communication slot data in the reception data.

A unique word detection circuit 3 inputs data taken in real time from bit positions equal to a unique word assigned to k bits at (n−k+1)th bit to (n)th bit of the reception data taken in the reception data shift register and detects a specific synchronization signal (unique word) included in a slot data signal to product a matching signal.

A slot counter circuit 4 sets an initial value for establishing a slot synchronization in response to the matching signal from the unique word detection circuit 3, and notices the establishment of the slot synchronization to a timing control circuit 5. The timing control circuit 5 defines a timing as a reception input completion signal and a timing of overall reception in response to the matching signal from the unique word detection circuit 3.

The unique word detection circuit 3 outputs a matching signal when k bit of reception data taken from the reception data shift register 2 is the unique word. The counter value indicative of the time information to be taken by the time slot upon detection of the unique word as a synchronization initial value at the output timing of the matching signal from the unique word detection circuit 3 is preset to the slot counter circuit 4.

Accordingly, when the slot counter circuit 4 counts the carry signal output from a bit counter (not shown) for counting the bit length of each slot whenever the bit length of each slot is counted, on the basis of the synchronization initial value, the slot synchronization can be established. It should be noted that as the synchronization initial value, a leading value of a slot number to be received, e.g. "0", is set.

When the data input to the reception data shift register 2 is terminated by the input control circuit 1 upon detection of the unique word, it means that correct slot reception data upon detection of the unique word is input to the m-bit reception data shift register 2.

Therefore, the data stored in the reception data shift register 2 at this time is fed out in parallel as the one time slot data to be processed as the reception data. On the other hand, by notifying the matching signal from the unique word detection circuit 3 to a not shown CPU, the matching signal may serves as reception completion signal.

Figure 2:
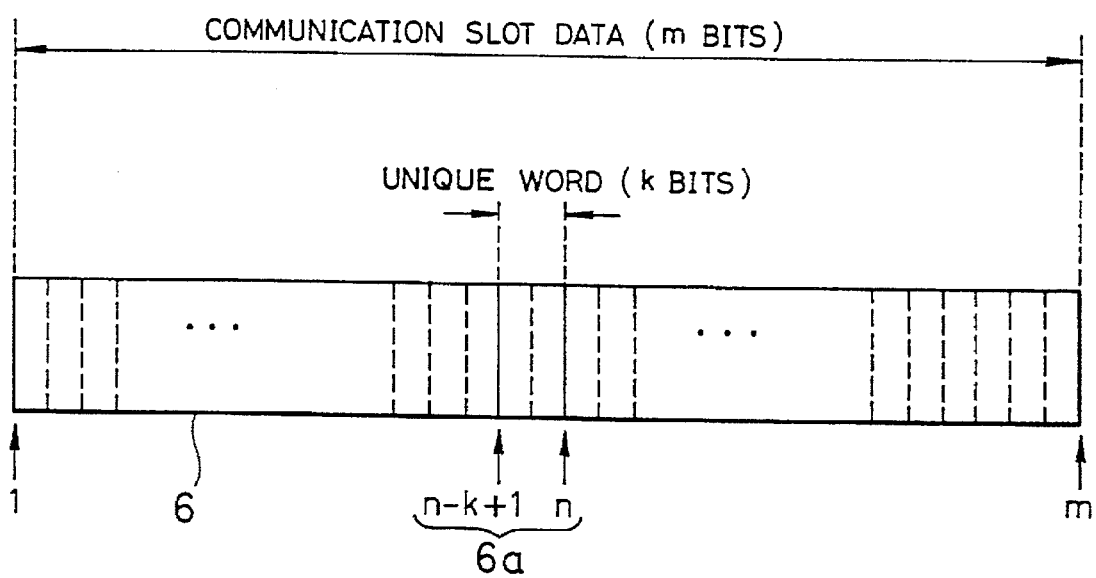
FIG. 2 is an illustration showing an example of a bit construction of a communication slot data.

In FIG. 2, the communication slot data 6 has a m-bit construction, in which k-bit unique word 6a is assigned for the position of (n–k+1)th to (n)th bit.

Figure 3:
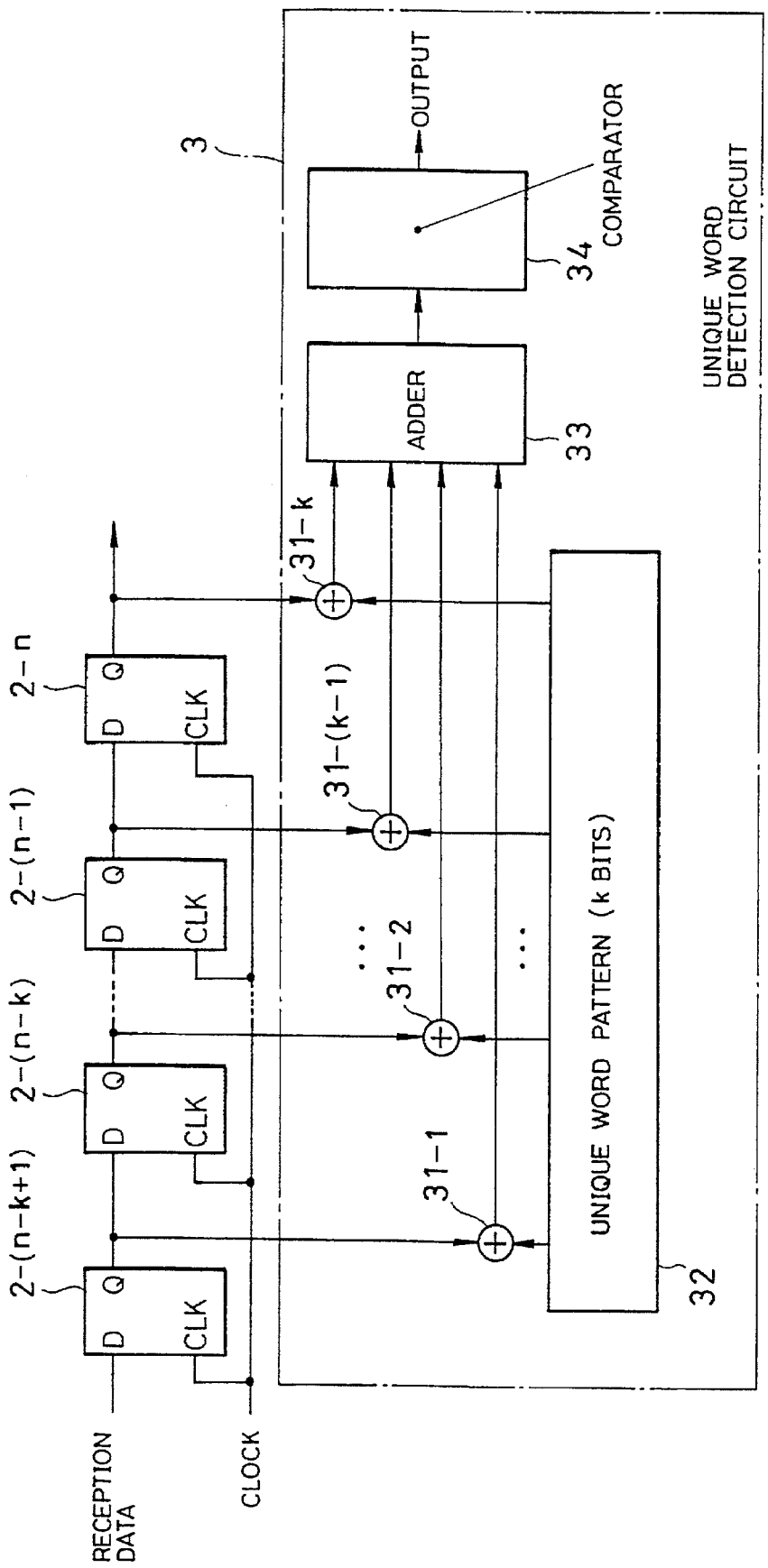
FIG. 3 is a block diagram showing a construction of a unique word detection circuit in FIG. 1.
Figure 5:
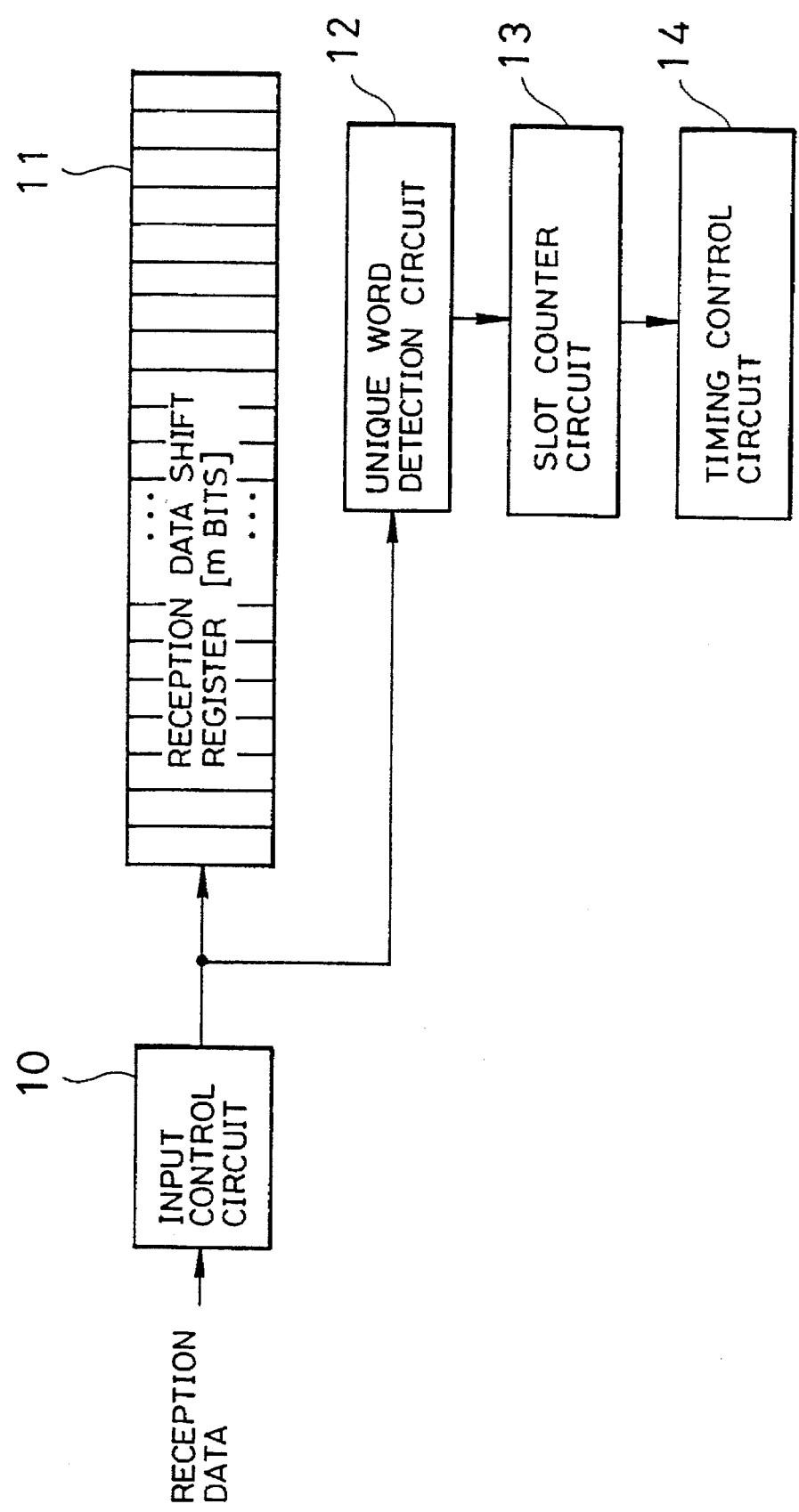
FIG. 5 is a block diagram showing a prior art.
Figure 6:
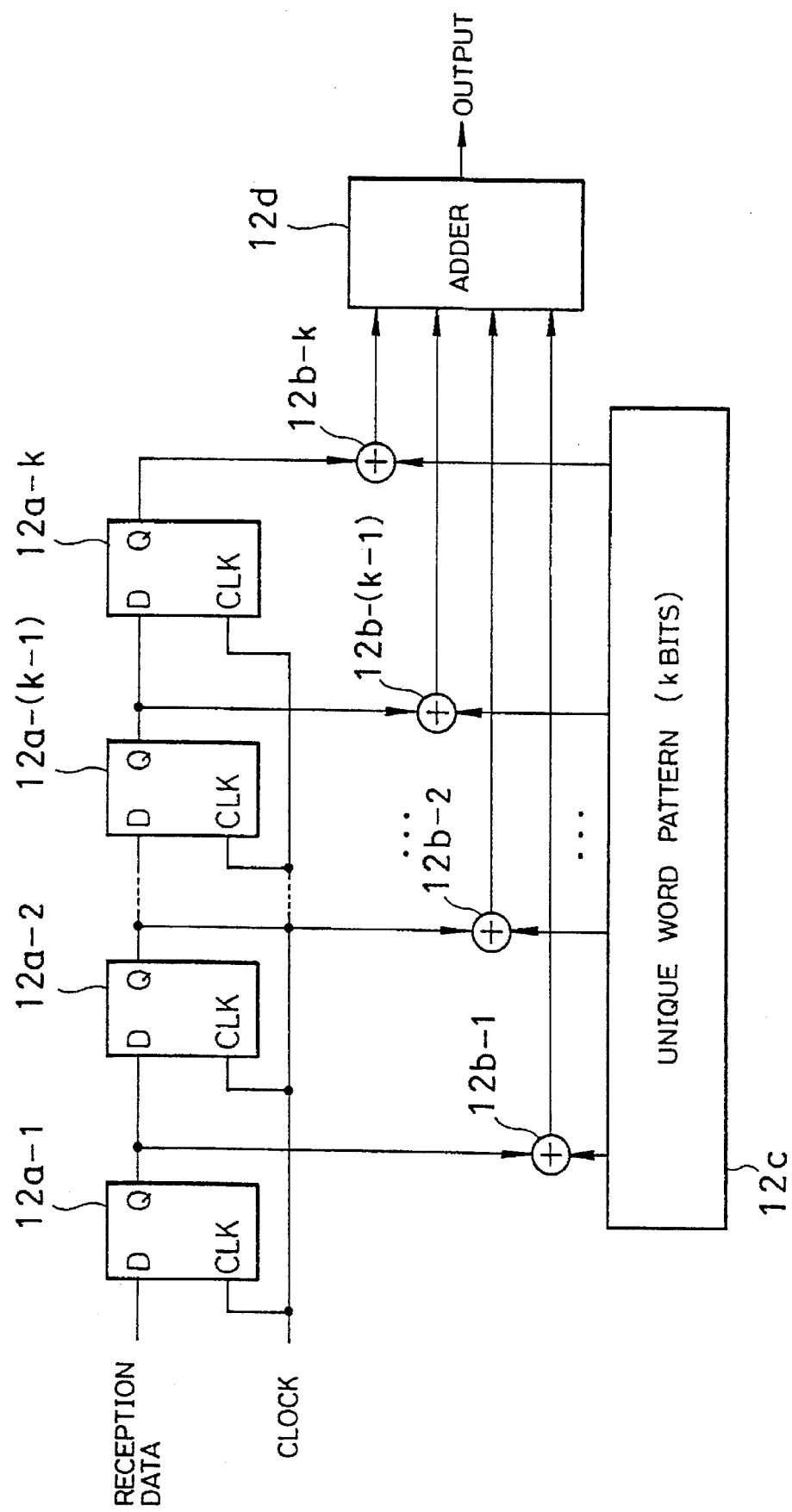
FIG. 6 is a block diagram showing a construction of a unique word detection circuit in FIG. 5.
Figure 7:
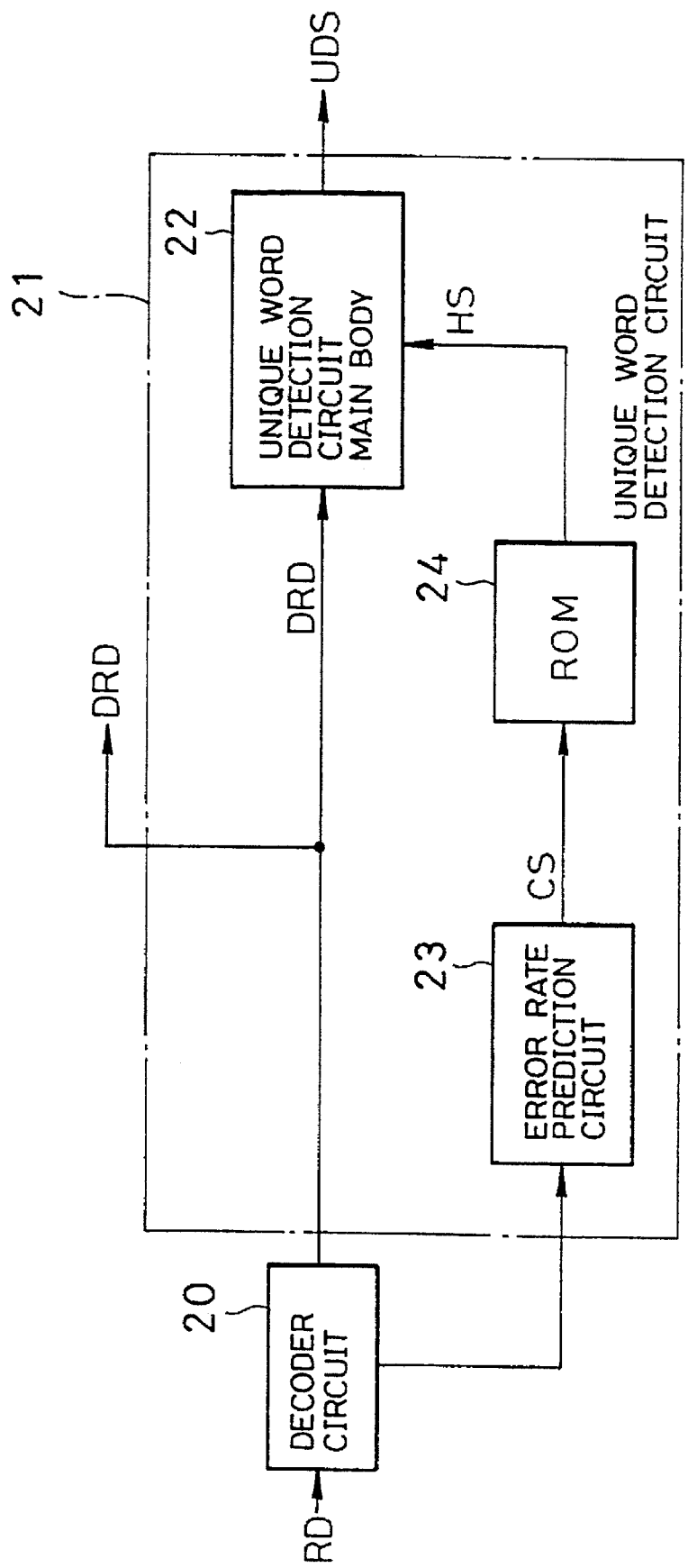
FIG. 7 is a block diagram showing a construction of another prior art.

In FIG. 3, in the unique word detection circuit 3, exclusive NOR (EXNOR) of the output of k-bits of the reception data shift registers of 2–(n–2k+1) to 2-n among m-bit reception data shift register 2 and the predetermined k-bit unique word pattern are taken by exclusive NOR circuits 31-1 to 31-k. The result of this operation is added by an adder 33. The resultant sum of the adder 33 is checked by a comparator 34 whether the error bit number is within an allowable error bit number range or not.

For instance, in the exclusive NOR circuits 31-1 to 31-k, all of k bits matches, k is output from the adder 33. On the other hand, if the unique word in which p bits of error are present in the k bits is received, k–p is output from the adder 33.

At this time, when p is set in the comparator 34 as allowable error bit number in order to allow a given number of error in the unique word 6a, judgement "k ≧ resultant sum of the adder 33 ≧ k–p" is made in the comparator 34. As a result, when the resultant sum is within the allowable number range, the matching signal (unique word detection signal) is output from the comparator 34.

When the matching signal is thus output from the unique word detection circuit 3, the counter value indicative of the time information to be taken by the slot at the timing of detection of the unique word is set. Then, by performing counting of the synchronization initial value by the carry signal from the bit counter, synchronization of the slot can be established.

When inputting of data to the reception data shift register 2 is terminated by the input control circuit 1 upon detection of the unique word, it means that the correct communication slot reception data is input to the m-bit reception data shift register 2. Therefore, the data of the reception data shift register 2 is fed out in parallel as the time slot data for processing.

In FIG. 4, P of an equation for calculating the failure rate of detection of the unique word indicated out of the frame of a table represents a certainty of detection of the unique word, and P1 represents the failure rate of detection of the unique word and which should be P1=1–P.

On the other hand, Pe represents an error rate, and N represents a unique word length. Furthermore, $\epsilon$ represents a correlation threshold value which shows that detection of the unique word is judged when the number of error is less than or equal to $\epsilon$. Here, the failure rate of the unique word means a certainty that the unique word is overlooked by error in the channel despite of the fact that the 32-bit of unique word included in the control channel upon hunting of an initial reception in a communication device.

FIG. 4 shows cases where the relative threshold value $\epsilon$ is less than or equal to 1 bit and where the relative threshold value $\epsilon$ is 0 bit. When the relative threshold value is less than or equal to 1 bit and if the error rate Pe is $10^{-2}$, the failure rate Pe of detection of the unique word becomes $0.7 \times 10^{-2}$, and the frequency (period) of occurrence becomes 15.4 ms.

Also, when the error rate Pe is $10^{-3}$, the failure rate P1 of the unique word becomes $4.86 \times 10^{-4}$. Then the frequency (period) of occurrence of the failure becomes 1.29s. Furthermore, when the error rate Pe is $10^{-4}$, the failure rate P1 of the unique word becomes $95 \times 10^{-6}$ and thus the frequency (period) of occurrence becomes 126s. In addition, when the error rate Pe is $10^{-5}$, the failure rate P1 of the unique word becomes $4.98 \times 10^{-8}$, and the frequency (period) of occurrence becomes 3.5 hours.

On the other hand, when the relative threshold value $\epsilon$ is 0 bit, when the error rate Pe is $10^{-2}$, the failure rate P1 of detection of the unique word becomes $2.75 \times 10^{-1}$ and the frequency (period) of occurrence becomes 2.27 ms. If the error rate Pe is $10^{-3}$, the failure rate P1 of the unique word detection becomes $3.15 \times 10^{-2}$, and the frequency (period) of occurrence becomes 19.8 ms.

Furthermore, if the error rate Pe is $10^{-4}$, the failure rate P1 of detection of the unique word becomes $19 \times 10^{-3}$ and the frequency (period) of occurrence becomes 196 ms. If the error rate Pe is $10^{-5}$, the failure rate P1 of the unique word detection becomes $3.20 \times 10^{-4}$, and the frequency (period) of occurrence becomes 1.95s.

Accordingly, comparing the cases where the relative threshold value $\epsilon$ is less than or equal to 1 bit and where the relative threshold value $\epsilon$ is 0 bit, the certainty of failure of detection of the control channel upon hunting is improved to be approximately 643 times in the error rate of $10^{-4}$, in case of a digital cordless telephone (RCR STD-28) in Japan.

Thus, by taking a bit string of the length corresponding to the unique word length from the reception data shift register in real time, as the input for the unique word detecting circuit 3, by making the length of the reception data shift register 2 to be equal to the bit length of the communication slot data 6 to be communicated and by making the position of the bit string taken from the reception data shift register to be consistent with the position assigned for the unique word 6a in the reception slot data 6, the data latched in response to the matching signal can be correctly input without requiring bit position correction and re-trying of reception, and the matching signal can be used as reception input completion signal.

Also, in the unique word detection circuit 3, by taking the exclusive NORs of the outputs of the k-bit reception data shift registers 2–(n–k+1) to 2-n and the predetermined unique word pattern 32 by the exclusive NOR circuits 31-1 to 31-k, adding the results of operation by the adder 33, and making judgement whether the resultant sum is within the allowable number range by the comparator 34, quite stable unique word detection can be performed even when the channel quality is fluctuated as long as the fluctuation is within the allowable range.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A time slot reception synchronization circuit for detecting a unique word which is included in one time slot data and for receiving the one time slot data in synchronism with said unique word, comprising:

time slot length data holding means having a bit-length equal to that of said one time slot data for holding received one time slot data corresponding to one time slot bit-length, said time slot length data holding means having parallel output terminals for outputting in parallel each bit of a bit pattern of a given bit range of a held time slot data, a bit-length of which is smaller than that of said time slot length data holding means and is equal to that of a bit pattern of a predetermined unique word, said parallel output terminals being provided only at bit positions corresponding to the bit positions of the given bit range of the held time slot data;

detecting means for detecting whether data output from said parallel output terminals is matched with a bit pattern of a predetermined unique word and for generating a matching signal when the data output from said parallel output terminals is matched with said predetermined unique word; and means for feeding out in parallel the held time slot data from said time slot length data holding means as time slot data in response to said matching signal.

2. A slot reception synchronization circuit as set forth in claim 1, wherein said detecting means includes judgement means for making judgement for matching of the bit pattern in the given bit range of said held slot data of said time slot length data holding means with the bit pattern of said unique word, per each bit.

3. A slot reception synchronization circuit as set forth in claim 2, wherein said judgment means includes arithmetic means which performs exclusive NOR operation for each bit of the bit pattern in the given range of said hold slot data of corresponding bits of the bit pattern of said unique word.

4. A slot reception synchronization circuit as set forth in claim 2, wherein said detection means includes adder means for adding matching results of each of the corresponding bits and allowable range detecting means for detecting whether the result of adding by said adder means falls within a preliminarily set allowance range.

5. A slot reception synchronization circuit as set forth in claim 1, wherein synchronization of time slot is established in response to said matching signal.

6. A slot reception synchronization circuit as set forth in claim 4, wherein said judgment means makes judgement that the given bit range of said held slot data matches with the unique word when the detecting means detects that the result of adding by said adder means falls within the allowable range.

* * * * *